June 15, 1954     R. S. HAHN     2,680,941
INTERNAL GRINDING MACHINE
Filed June 26, 1951     3 Sheets-Sheet 1

Inventor
Robert S. Hahn
By Dike + Sanborn
Attorneys

June 15, 1954
R. S. HAHN
2,680,941
INTERNAL GRINDING MACHINE
Filed June 26, 1951
3 Sheets-Sheet 2
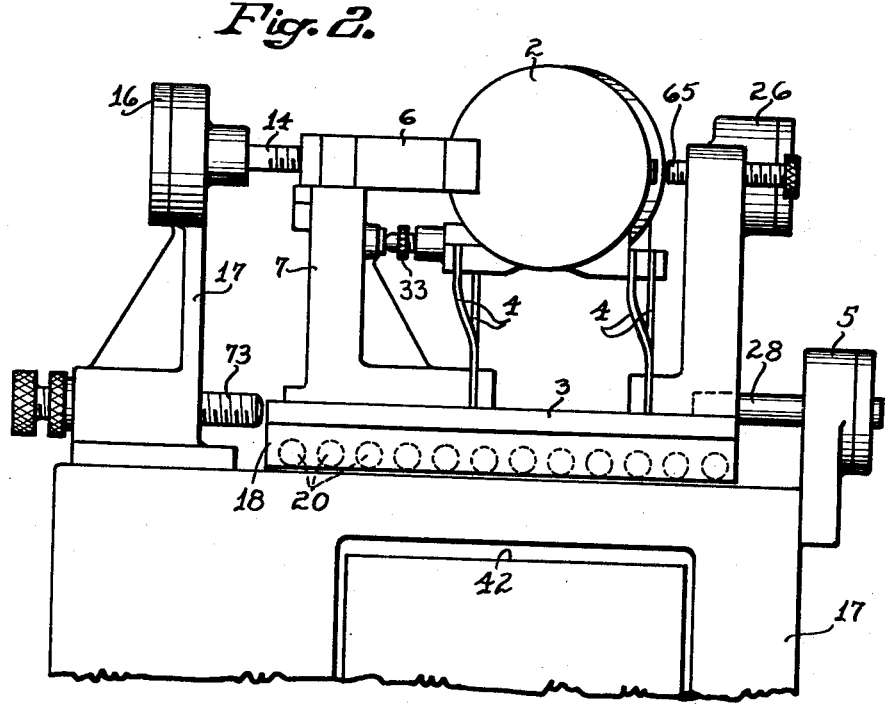
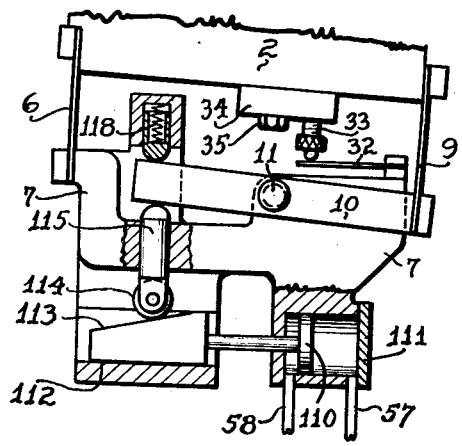
Inventor
Robert S. Hahn
By Pike + Sanborn
Attorney

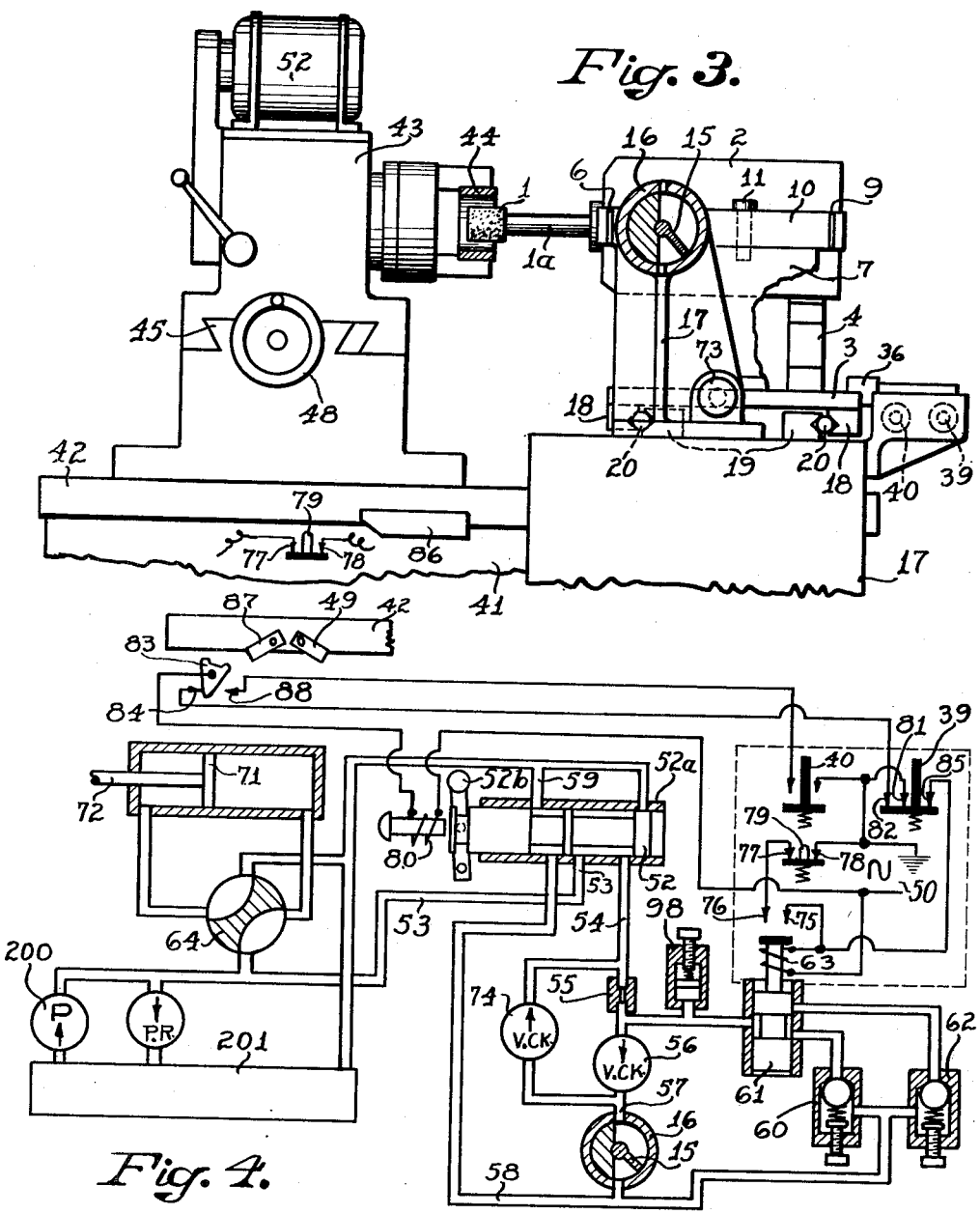

Patented June 15, 1954

2,680,941

UNITED STATES PATENT OFFICE 2,680,941

INTERNAL GRINDING MACHINE

Robert S. Hahn, Northboro, Mass., assignor to The Heald Machine Company, Worcester, Mass., a corporation of Massachusetts Application June 26, 1951, Serial No. 233,655

30 Claims. (Cl. 51—165)

This invention relates to feed mechanism for internal grinding machines.

Such machines are usually designed to feed the wheel and the work toward each other—i. e. in cross feed, at a rapid rate at least until first contact is made between wheel and work, and then to reduce the infeed to a rate which is suitable for rough grinding. In order to load the grinding wheel immediately on contact with the workpiece, which is a prerequisite for high production rates, especially where it is necessary to use flexible spindles, I have found it highly desirable to force the wheel against the workpiece at a definite or controlled force rather than to cause the wheel to be fed at a definite or controlled feed rate as is conventional. Furthermore, to fully utilize the cutting ability of the grinding wheel, it is essential to operate the wheel at a definite force just under that required to break down or crush the wheel.

The usual practice has been to attempt to adjust the feed rate by trial and error to such a value that the maximum permissible force was induced. Because of stock and hardness variation in the workpieces, of changes in wheel diameter and wheel dulling, the force induced by the conventional constant feed rate method of feeding the cross slide is highly variable. This results in either wheel breakdown or inefficient usage of the wheel. Furthermore, the lateral deflection of the spindle fluctuates in accordance with the variable induced force, causing serious size variations when the position of the feeding mechanism is used to determine the size of the work.

In view of the foregoing, substantial advantages are obtained by applying the wheel to the workpiece under a definite or controlled force. However, if the wheel were simply applied to the work by a constant force, it would follow irregularities in the rough surface of the work, instead of removing them. I, therefore, also provide means for rounding up the rough bore and for producing a truly cylindrical or conical hole.

The means provided for producing a truly cylindrical or conical hole include automatic means for changing the angular relation between the wheel support and the work support in response to changes in pressure between wheel and work and in a direction to compensate for the angular deflection of the wheel spindle and other parts. In other words, the angular relation between one of the supports and the line of relative traverse of the supports is varied during the grinding cycle. The surface being ground is, therefore, more nearly true at the end of the roughing operation than it would be if compensation were not made for angular deflections, consequently less stock need be left for removal in the comparatively slow finish grinding operation in which wheel pressure is automatically reduced in accordance with the invention. Means are also provided to inhibit separation of wheel and work due to irregularities in the work. The rate of production is substantially increased in the machine of the invention.

As a result of the provisions which have been outlined, the deflections of the wheel spindle and other parts may be held practically constant for successive workpieces. The position of the feeding mechanism may, therefore, be used to terminate the roughing operation, initiate truing and terminate the finishing operation with much greater accuracy, as regards the size of the work, than if variable deflections occurred between the feed mechanism and the surface of the work.

In the drawings:

Fig. 2 is an end elevation viewed from the right of Fig. 1;

Fig. 3 is a front elevation;

Fig. 4 is a diagrammatic view showing the electric and hydraulic controls; and

Fig. 5 is a partial plan view partly in section of a modification.

Figure 1:
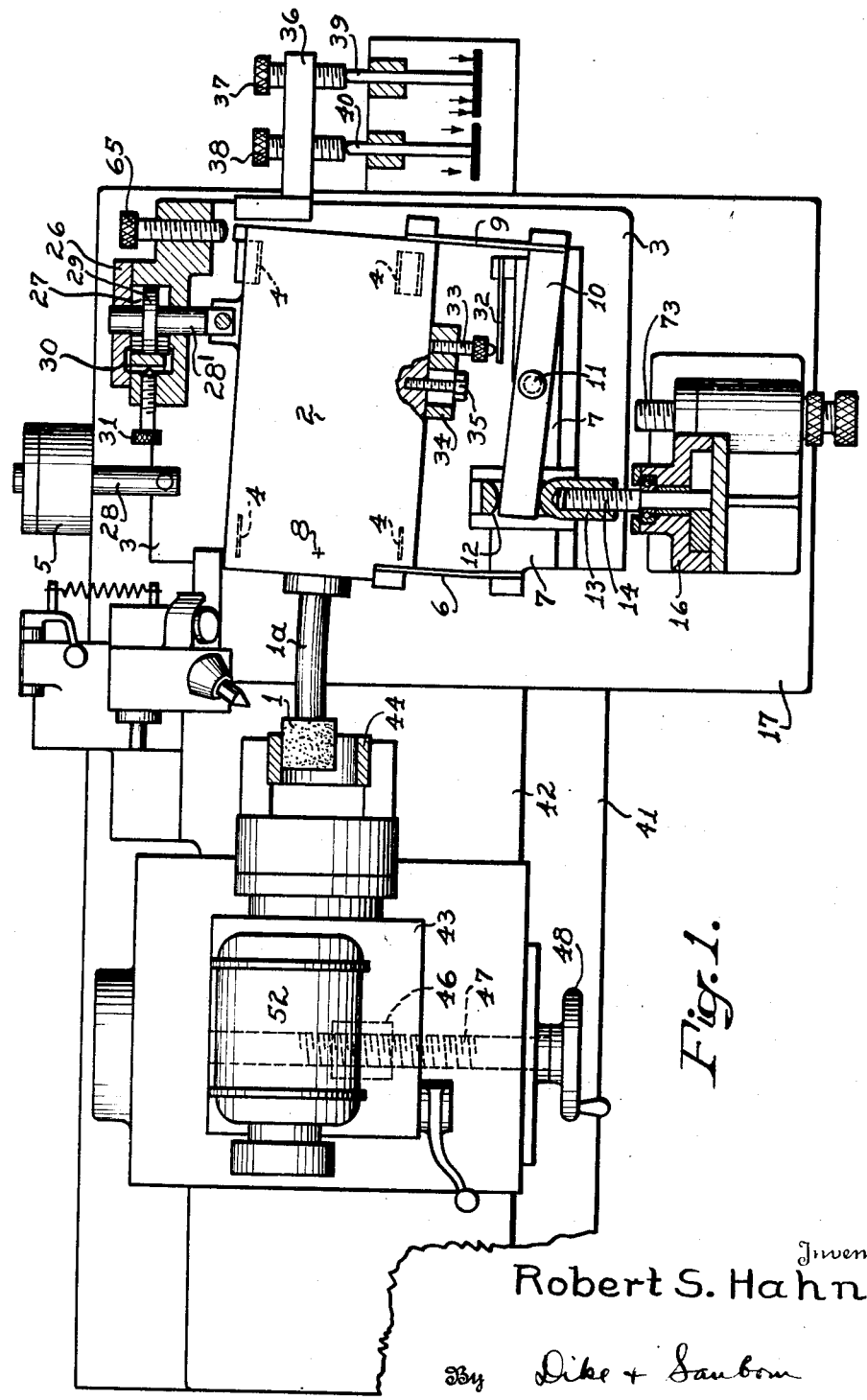
Fig. 1 is a plan view of a machine embodying the invention.

The internal grinding machine may be of the general type described in the patent to Guild No. 1,682,672, dated August 28, 1928, and in the patent to Blood et al. No. 2,011,705, dated August 20, 1935. In this type of grinding machine, the wheel relatively enters the work, is fed against it for roughing, is withdrawn from the work and trued, re-enters the work, is fed against it for finishing and is finally withdrawn. The work and the wheel are commonly relatively reciprocated along the line of their relative traverse to move the wheel back and forth across the face of the work while they are in contact, but reciprocation may be omitted in some cases.

In the above mentioned Guild and Blood et al. patents, the wheel is fed against the work at a fixed rate for roughing and at a slower rate for finishing as distinguished from machines of the present invention in which roughing feed is procured by the application of a fixed or limited force to move the wheel into the work. Finish feed may also be produced by reduced fixed force, provision being made for automatic reduction of the force during the grinding cycle.

In the present invention the work and wheel supports are mounted in such a way that the angle between the supports, or the angle between one of these supports and the path of their relative traverse and reciprocation may be changed during the grinding cycle.

In the drawings, Figs. 1, 2 and 3, show a machine assembled on a base 41. A wheel 1 is carried on a wheel head 2 of the self-contained electric motor or air turbine type. The wheel head is pivotally mounted on a horizontal cross slide 3 by means of four vertical reeds or springs 4 and one horizontal reed 6. The reeds 4 are adapted to locate the wheel head vertically and axially, but to allow it to move or swivel in the plane of cross slide motion. The reed 6 is attached to a bracket 7 on the slide 3 and locates the front end of the wheel head. The effect of the reeds 4 and 6 is thus equivalent to an antifriction pivot which allows the wheel head to swing about a vertical axis indicated at 8.

The wheel head 2 is swivelled by force applied through a reed 9 which connects the wheel head to a lever 10 which is pivoted at 11 to the bracket 7. The lever 10 fits a slot 12 in a nut 13 which is thereby prevented from turning. The nut 13 is advanced by a screw 14 which is turned by a vane 15 in a housing 16 which is shown mounted on a stationary bridge 17 on the base 41.

The cross slide 3 is supported by a bridge 17 through antifriction ways 18 and 19 and balls 20.

A leaf spring 32 attached to the bracket 7 on the slide 3 bears against a screw 33 in a block 34 which is slotted to clear a screw 35 which fastens the block 34 to the wheel head 2. This construction makes it possible to fasten the block 34 in different positions to change the effective length of the spring 32, thereby changing its spring rate for a purpose to be described.

A table 42 is arranged to be traversed and reciprocated slidably on the base 41 and carries a work support, shown as a work head 43, which is powered by a motor 52 and which holds and rotates a workpiece 44. The work head 43 is movable crosswise of the table 42 on dovetail ways 45, and is controlled by a nut 46 and screw 47 on which is mounted a feed wheel 48. The wheel 48 may be turned manually or by any suitable means at the end of each cycle of the machine to provide compensation for wheel wear.

Figs. 1 to 4 show the various parts at the end of the roughing operation just prior to retraction of the wheel for truing. A reversing valve 64 is operated in the usual way under the control of dogs (not shown) carried by the table 42, as illustrated in the patent to Blood et al. No. 2,011,705, August 20, 1935, to reciprocate the piston 71 and table 42 which are connected by a rod 72. A valve plunger 52 in a valve 52a is shown in its left or feed position, allowing oil to pass from a constant pressure fluid pump 200 through lines 53 and 54 across the valve 52a, a resistance 55, and a check valve 56 and thence through port 57 to the upper side of the vane 15, turning it clockwise. Oil from below the vane 15 flows out through a line 58 across the plunger 52 and through a line 59 to exhaust into a supply sump 201.

The pressure on the vane 15 and hence the force of wheel feed is controlled by a relief valve 60 for rough grinding when a valve 61 is down as shown and by a valve 62 for finish grinding when the valve 61 is lifted. The resulting clockwise movement of the vane 15 turns the screw 14, moving the nut 13 against the left end of the lever 10 with a force determined by the setting of the valve 60. The lever 10 is thereby urged clockwise, pulling through the reed 9 on the right end of wheel head 2 and urging it to swivel clockwise about the pivot point 8. Clockwise swivelling of the wheel head 2 and lever 10 is, however, resisted by the spring 32. Hence the force exerted by the nut 13 on the lever 10 urges the slide 3 in a direction to press the wheel 1 against the work 44 with a force which will equal that exerted by the nut 13 on the lever 10. The only external horizontal forces acting on the slide 3 and the parts attached thereto are those exerted by the work against the wheel 1 and by the nut 13 against the lever 10, consequently these two opposed forces must balance. The lever 10 is shown for convenience with equal arms so that the tension in the reed 9 will equal the force applied to the lever 10 by the nut 13, which is equal to the force on the wheel. While the force on the wheel 1 tends to swivel the head 2 counterclockwise, the equal tension in the reed 9 tends to swivel it clockwise and acts on a longer lever arm, the pivot point 8 being closer to the wheel than to the reed 9. As a result, the head is swivelled against the spring 32 with a force proportional to the horizontal force on the wheel and hence through an angle proportional to this force. Since the deflection of the wheel spindle 1a and other parts is also proportional to the force on the wheel, by adjusting the rate of the spring 32, the angle through which the head 2 swivels is made sufficient to compensate for these angular deflections. The cutting surface of the wheel remains parallel to the desired work surface in spite of variations of force between wheel and work. Wheel wear is, therefore, more uniform and time is saved, especially in the finishing operation because correction of wheel and work taper is not required.

The cross slide 3 may also have a damping connection with the bridge 17, for example a dashpot 5 mounted on the bridge 17 and connected to the slide 3 by a piston rod 28.

A similar dashpot 26 is shown mounted on the slide 3 and connected to the wheel head 2 by means of a piston rod 28'.

Each dashpot 5 and 26 is in the form of a cylinder 27 containing a piston 29 on rod 28 or 28'. A passage 30 provided between the two ends of each cylinder 27 allows fluid in the cylinder to flow from one end to the other under control of a throttle screw 31. The dashpots 26 and 5 resist rapid swivelling of the wheel head 2 and rapid motion of the slide 3. The dashpots 5 and 26, therefore, tend to prevent the wheel 1 from following irregularities in the work surface when the work 44 is rotated at conventional high speeds, and the work surface may, therefore, be ground truly round within close tolerances.

A screw 65 is provided in the frame of the dashpot 26 to limit counterclockwise swivelling of wheel head 2. The screw 14 has a much higher lead angle than screws which have hitherto been used to feed wheels at fixed rates. A high angle is essential in this embodiment, because to control the force between wheel and work it is necessary for this force to limit the rate at which the wheel advances, the higher the lead, the more easily an axial force on nut 13 can slow down or stop rotation of the screw 14. However, I do not make the lead so high that the screw would be easily reversible, as in that case irregularities in the rough work could easily force the screw to turn backward, allowing the wheel to follow the irregularities and this is prevented by the screw 14 and also by the dashpots 5 and 26.

Before truing the wheel after rough grinding the wheel is retracted from the work and the slide 3 is brought to a definite position against a screw stop 73 (Fig. 1) and the head 2 swivelled to a definite angle and locked in position against the screw stop 65 provided in the frame of the dashpot 26 to limit counterclockwise swivelling of the head 2. These motions may be initiated in the present machine when a gage enters the work, or when a part of the feed mechanism reaches a preset position. In the machine illustrated, a switch 39 (Figs. 1, 3 and 4) is mounted on the bridge 17 and is closed when the slide 3 reaches a position determined by the setting of a screw 37 in an arm 36 attached to the slide 3.

Closure of the switch 39 energizes a solenoid 80 (Fig. 4) by connecting it with a power source 50 across a pair of contacts 81 and 82 and a switch 83 through one of its contacts 84. The solenoid 80 then moves the valve member 52 to the right and into "retract" position in which it connects line 53 through line 58 to supply fluid pressure to turn the vane 15 counterclockwise, causing the nut 13 to pull on the lever 10 which, pushing through the reed 9, swivels the wheel head 2 against the screw 65 and retracts the slide 3 against the screw 73. The wheel head and slide are thus locked against stops for the truing operation, which may be carried out by manual or suitable automatic operation of the reversing valve 64 to traverse the wheel across a truing tool in the usual manner.

As the vane 15 moves counterclockwise it pushes oil through a check valve 74 into the line 54 which is now connected to exhaust to the sump 201 across the valve 52a and through the line 59.

Closure of the switch 39 at the end of roughing also energizes a solenoid 63 by connecting it to the power source 50 across the contacts 81 and 85. The solenoid raises the valve member 61 and connects contacts 75 and 76 through which a holding circuit is established for the solenoid 63 through the contacts 77 and 78 of a switch 79. The raising of the valve member 61 cuts off the by-pass valve 60 which has controlled the pressure on the vane 15 during the roughing operation, and connects the by-pass valve 62 which is adjusted to bleed off a greater portion of the fluid passing through resistance housing 55, thereby further reducing the pressure on the vane 15 during the finishing operation when the valve 52 is moved back into feed position after truing. Thus the constant force exerted on the wheel by the feed mechanism is automatically changed during the cycle.

After truing, the wheel may be traversed to reenter the work and the valve 52 may be moved back to the left to its feed position manually as by a handle 52b or by suitable automatic means. This movement of the valve 52 back to its feed position again directs pressure from the line 53 through the line 54, and feeding is resumed at a low pressure regulated by valve 62. Retraction of the slide 3 after rough grinding reopens the switch 39 but the circuit through the solenoid 63 remains closed through the contacts 77 and 78 of the switch 79 until they are opened after grinding is completed.

When the table 42 is traversed partially out to the left during the truing operation, a table dog 87 (Fig. 4) moves the switch element 83 counterclockwise away from its contact 84 and against a contact 88. This takes the switch 39 out of the circuit through the solenoid 80 and places a switch 40 in the circuit.

The finish grinding operation is terminated when the switch 40 is closed by contact with an adjustably positioned screw 38 in the arm 36 when the feed mechanism and the slide 3 reach a preset position. Closing of the switch 40 again energizes the solenoid 80 moving the valve member 52 to its retract position to the right, separating the wheel radially from the work as before.

As the reversing valve 64 is operated to traverse the table 42 out to its home position after the work is finished, a table dog 86 attached to the table 42 (Fig. 3) rides over the switch 79 to open the circuit across the contacts 77 and 78 to the solenoid 63, de-energizing the latter to allow the valve member 61 to fall to its down position ready to start another cycle.

When the finished workpiece has been replaced by a rough workpiece, the reversing valve 64 may be moved manually to cause the table 42 to move to the right and the wheel to enter the work. At this time a table dog 49 restores the switch 83 to the position shown.

The valve 52 may now be moved to its feed position to the right connecting pressure to the line 54 and through the resistance 55 and the check valve 56 to the vane 15. The vane 15 turns to feed the wheel toward the work at a rapid rate determined by the resistance 55. As the bore of the rough work is usually eccentric, the wheel will at first touch the work at one point in the circumference of the bore at each revolution of the work. During each revolution of the work, the average force between the wheel and the work will now be much less than the maximum force. It is, therefore, desirable to keep this average force low, to avoid an excessive maximum force. I, therefore, provide an accumulator 98 into which the oil which passes the resistance 55 flows when the oil pressure on the vane 15 rises slightly as the result of pressure between the wheel and the work. After a brief interval, which allows the wheel time to round up the work, the accumulator 98 fills, allowing the oil pressure to rise until the relief valve 60 opens. This pressure is maintained on the vane 15 during the remainder of the roughing operation.

A modification of part of the feed mechanism is shown in Fig. 5. It may be substituted for the nut 13, screw 14 and vane 15 for operating the lever 10 and comprises a fluid pressure piston 110 operating in a cylinder 111 and connected to move a wedge member 112 having an inclined surface 113 upon which rides a roll 114 on one end of a follower member 115 slidably mounted in the bridge 7 and the other end of which operatively abuts against the lever 10. The fluid pressure lines 57 and 58 of Fig. 4 are connected to the cylinder 111 so that fluid under pressure in the line 57 moving the piston 110 to the left causes inward movement of the left end of the lever 10 to feed the wheel and pivot its support as in Figs. 1–4. A spring 118 causes retraction of the wheel when the wedge member 112 is retracted to the right by reversal of fluid pressure in the lines 57 and 58 in the manner above described. The pitch of the surface 113 can be adjusted so that the force exerted by the wheel on the work is sensitively proportioned to the predetermined pressure in the cylinder 111 and at the same time the feed mechanism has at least a strong tendency to resist reversing—i. e. allowing the wheel to back away from the work due to irregularities in the work surface. In other words it takes a great deal more force to move the wheel away from the work than is exerted to move the wheel against the work, the latter being limited to the desired predetermined magnitude.

I claim:

1. In an internal grinding machine, a work support, a wheel support having a wheel, said supports being relatively movable, means to feed one of said supports to bring said wheel rapidly into contact with said workpiece, means responsive to contact between said wheel and said workpiece to limit to a preset value the force applied to said feed means by which said wheel is applied to said workpiece for a rounding operation, and means to increase said force for a roughing operation.

2. In an internal grinding machine a work support, a wheel support having a grinding wheel, said supports being relatively movable, constant force feed means to move one of said supports relative to the other to feed said wheel against a workpiece in said support with a predetermined force and at a constantly variable rate, and means to change said force at a predetermined point in the grinding cycle.

3. In the combination as set forth in claim 2, means operating to separate the tool and the work at a predetermined point in the grinding cycle.

4. In the combination as set forth in claim 2, said constant force feed means being unyielding to irregularities in said workpiece.

5. In the combination as set forth in claim 2, said constant force feed means including a feed screw.

6. In the combination as set forth in claim 2, said constant force feed means including a wedge.

7. In an internal grinding machine, a work support, a wheel support having a wheel, said supports being relatively movable, means to feed one of said supports to bring said wheel rapidly into contact with said workpiece, means responsive to contact between said wheel and said workpiece to limit to a preset value the force with which said wheel is applied to said workpiece, and means operating at a predetermined point in the cutting of a workpiece to reduce said force for a finishing operation.

8. In an internal grinding machine a work support, a wheel support having a grinding wheel, said supports being relatively movable to feed the wheel against a work piece in said work support and one of said supports being pivotally movable relative to the other, feed means to feed said wheel against the work piece and means automatically to vary the pivotal relation of said supports during grinding in proportion to the force between the wheel and the work, thereby compensating for angular deflections in said supports caused by said force.

9. In an internal grinding machine a work support, a wheel support having a grinding wheel, said supports being relatively movable to feed the wheel against a work piece in said work support and one of said supports being pivotally movable relative to the other, constant force feed means to feed said wheel against the work piece with a predetermined force and at a constantly variable rate, means to change said force during the grinding cycle, and means automatically to change the angle of one of said supports relative to the other during the grinding cycle thereby compensating for deflections in said supports caused by changes in force between wheel and work.

10. In an internal grinding machine a work support, a wheel support having a grinding wheel, said supports being relatively movable to feed the wheel against a work piece in said work support and one of said supports being pivotally movable relative to the other, constant force feed means to feed said wheel against the work piece with a predetermined force and at a constantly variable rate, said feed means including means automatically to vary the pivotal relation of said supports during grinding in proportion to the force between the wheel and the work thereby compensating for deflections in said supports caused by said pressure between wheel and work.

11. In an internal grinding machine a work support, a wheel support having a grinding wheel, said supports being relatively movable to feed the wheel against a work piece in said work support and one of said supports being pivotally movable relative to the other, means applying a predetermined force against said pivotal support in a direction to move it relatively toward the other and at a point tending to swivel said pivotal support in proportion to the resulting force between the wheel and the work.

12. In an internal grinding machine a work support, a wheel support having a grinding wheel, a slide, said wheel support being pivotally mounted on said slide, constant force feed means acting against said wheel head to move said wheel support slidably toward said work support and after said wheel makes contact with a work piece in the work support, to swivel said work head in proportion to the resulting force between wheel and work piece thereby tending to compensate for deflections in said supports.

13. In an internal grinding machine a work support, a wheel support having a grinding wheel, a slide, said wheel support being pivotally mounted on said slide, a lever pivotally mounted on said slide with one end connected to said wheel support, spring means urging said wheel support into alignment with said work support, and constant force means applicable to the opposite end of said lever in a direction to move said wheel support slidably toward said work support until contact is established between wheel and work, and then to swivel said wheel support against said spring means while the wheel is cutting the work.

14. In a grinding machine, including a base, a work support, a wheel support having a grinding wheel, one of said supports having an anti-friction mounting and being movable relative to said base and to the other support to feed the wheel against a work piece in said work support constant force feed means to move one of said supports relative to the other to feed said wheel against a workpiece in one of said supports with a substantially predetermined force and at a variable speed rate; and double-acting damping means between said movable support and said base, said damping means being operative to oppose relative vibrating motion between said support and said base.

15. In a grinding machine, a work support, a wheel support, one of said supports being pivotally mounted relative to a part of said machine constant force feed means to move one of said supports relative to the other to feed said wheel against a workpiece in one of said supports with a substantially predetermined force and at a variable speed rate; and double-acting damping means connected between said pivotal support and said part, said damping means being operative to oppose relative vibrating motion between said support and said part.

16. In an internal grinding machine a work support, a wheel support having a grinding wheel, a slide, said wheel support being pivotally mounted on said slide, a stop for said slide and wheel support limiting their movement in one direction, constant force feed means acting against said wheel head to move said wheel support slidably toward said work support and after said wheel makes contact with a work piece in the work support, to swivel said work head in proportion to the resulting force between the wheel and the workpiece thereby tending to compensate for deflections in said supports, and means to lock said slide and wheel support respectively against said stops to allow said wheel to be trued.

17. In an internal grinding machine a work support, a wheel support having a grinding wheel, said supports being relatively movable to feed the wheel against a work piece in said work support and one of said supports being pivotally movable relative to the other, constant force feed means to feed said wheel against the work piece with a predetermined force and at a constantly variable rate, said feed means including means automatically to vary the pivotal relation of said supports during grinding in proportion to the force between the wheel and the work thereby compensating for deflections in said supports caused by said pressure between wheel and work and means responsive to the position of said feed means automatically to separate said wheel and work.

18. In an internal grinding machine, and in combination, a work support, a tool support and a tool, said supports being movable relative to each other along a path of traverse and across the path of traverse, constant pressure feed means operating to move one of said supports relative to the other across said path of traverse to apply the tool to the work at a constant predetermined force independent of the rate of said movement, means connected to one of said supports to move it relative to the other along said path of traverse and swivel means connected to one of said supports operating during a grinding operation to change its angular relation to said path of traverse, thereby compensating for deflections resulting from the force between the tool and the work.

19. In the combination as set forth in claim 18, said constant pressure feed means including non-reversing means preventing said feed means from yielding due to irregularities in the workpiece.

20. In the combination as set forth in claim 18, said constant pressure feed means including a feed screw.

21. In the combination as set forth in claim 18, said constant pressure feed means including a wedge.

22. In an internal grinding machine and in combination, a work support, a rotary tool and a tool support, said supports being movable toward and away from each other on a path of traverse, one of said supports being pivotable relative to said path of traverse, constant pressure means to feed one of said supports relative to the other across said path of traverse to apply the tool to the work at a constant force, said feed means including means to change the force exerted by the tool on the work at a predetermined point in the cutting of a workpiece, and means connected to said pivotable support which respond to said change in force to change the angular relation of said pivotable support relative to said path of traverse thereby compensating for deflections caused by the force between tool and work.

23. In an internal grinding machine and in combination, a work support, a rotary tool and a tool support, said supports being movable toward and away from each other on a path of traverse, one of said supports being pivotable relative to said path of traverse, feed means connected to one of said supports to move it relative to the other across said path of traverse to apply the tool to the work, and swivel means connected to said pivotable support and controlled by the force between the tool and the work operating automatically during grinding to vary its angular relation relative to said path of traverse in proportion to the force between the tool and the work, thereby compensating for deflections caused by said force.

24. In the combination as set forth in claim 23, means to true said tool.

25. In the combination as set forth in claim 23 means to change said force at a predetermined point in the grinding cycle.

26. In the combination as set forth in claim 23, means to adjust the magnitude of the angular variation of said pivotable support with relation to the force between the tool and the work.

27. In an internal grinding machine and in combination, a work support, means to rotate a workpiece in said support, a tool support, a rotary tool supported thereby, said supports being movable relative to each other, feed means to move one of said supports relative to the other to apply the tool against the workpiece at a constant predetermined force and at a variable rate as necessary to maintain said force, said feed means including means preventing reversal of said feed movement during the cutting operation due to irregularities in the workpiece.

28. In the combination as set forth in claim 27, means operating to separate the tool and the work at a predetermined point in the grinding operation.

29. In an internal grinding machine and in combination, a work support, a tool support and a tool, guide means for moving one of the supports relative to the other along a path of traverse, constant pressure feed means operating to feed one of said supports relative to the other across the path of traverse to apply the tool to the work at a constant predetermined force independent of the rate of feed movement, pivot means associated with said guide means controlling one of said supports and operating during a grinding operation to change the angular relation of said support and said path of traverse, thereby compensating for deflection resulting from the force between tool and work.

30. In an internal grinding machine and in combination, a work support, a rotary tool and a tool support, a guide between said supports along which one support is movable relative to the other providing a path of traverse, pivot means associated with one of said supports operable to vary the angular relation of said support relative to said path of traverse, cross feed means connected to move one of said supports relative to the other across the path of traverse to apply the tool to the work, said pivot means and said cross feed means being arranged with respect to each other to provide constant variability of said angular relation in proportion to the force exerted by the cross feed means between the tool and the work.

References Cited in the file of this patent

UNITED STATES PATENTS

| Number | Name | Date |
| --- | --- | --- |
| 2,027,627 | Blood et al. | Jan. 14, 1936 |
| 2,287,559 | Nye | June 23, 1942 |
| 2,367,069 | Styberg | Jan. 9, 1945 |
| 2,368,992 | Ljunggren | Feb. 6, 1945 |
| 2,453,678 | Silven | Nov. 9, 1948 |
| 2,517,193 | Fraser | Aug. 1, 1950 |